United States Patent
Padilla

(10) Patent No.: US 10,837,406 B2
(45) Date of Patent: Nov. 17, 2020

(54) FLOW CONTROL SYSTEM FOR A ROCKET ENGINE WITH PARALLEL FUEL PASSAGE NETWORK

(71) Applicant: Aerojet Rocketdyne, Inc., Sacramento, CA (US)

(72) Inventor: Mario Padilla, Los Angeles, CA (US)

(73) Assignee: AEROJET ROCKETDYNE, INC., Canoga Park, CA (US)

(*) Notice: Subject to any disclaimer, the term of this patent is extended or adjusted under 35 U.S.C. 154(b) by 377 days.

(21) Appl. No.: 15/580,070

(22) PCT Filed: Jul. 1, 2016

(86) PCT No.: PCT/US2016/040629
§ 371 (c)(1),
(2) Date: Dec. 6, 2017

(87) PCT Pub. No.: WO2017/011208
PCT Pub. Date: Jan. 19, 2017

(65) Prior Publication Data
US 2018/0135560 A1    May 17, 2018

Related U.S. Application Data

(60) Provisional application No. 62/192,037, filed on Jul. 13, 2015.

(51) Int. Cl.
*F02K 9/58* (2006.01)
*F02K 9/46* (2006.01)
(Continued)

(52) U.S. Cl.
CPC ............ *F02K 9/58* (2013.01); *B64G 1/401* (2013.01); *B64G 1/402* (2013.01); *F02K 9/42* (2013.01);
(Continued)

(58) Field of Classification Search
CPC ... F02K 1/002; F02K 9/42; F02K 9/44; F02K 9/46; F02K 9/56; F02K 9/563;
(Continued)

(56) References Cited

U.S. PATENT DOCUMENTS 3,050,938 A    8/1962    Twyford
3,161,017 A    12/1964   Holmes
(Continued)

FOREIGN PATENT DOCUMENTS

GB    704850 A  *  3/1954   ............... F02C 9/28
GB    1250491       10/1971

OTHER PUBLICATIONS

International Preliminary Report on Patentability for International Application No. PCT/2016/040629 dated Jan. 25, 2018.
(Continued)

*Primary Examiner* — William H Rodriguez
*Assistant Examiner* — Kyle Robert Thomas

(57) ABSTRACT

A flow control system (22) includes a fuel passage network (34) that has first (36) and second (38) network portions that are in a parallel flow arrangement with each other. A fueldraulic device (40) is located in the first network portion. Operation of the fueldraulic device varies flow through the first network portion. A flow restriction orifice (42) is located in the fuel passage network and is arranged in series with, and upstream of, the fueldraulic device. The flow restriction orifice is operable to generate a pressure differential that varies responsive to the flow through the first network portion. A flow control valve (44) is located in the second network portion. The flow control valve is operable responsive to the pressure differential across the flow restriction orifice to control flow through the second network portion.

14 Claims, 2 Drawing Sheets

(51) Int. Cl.
*F02K 9/80* (2006.01)
*F02K 9/84* (2006.01)
*F02K 9/56* (2006.01)
*F02K 9/42* (2006.01)
*F02K 9/44* (2006.01)
*B64G 1/40* (2006.01)
*F02K 9/62* (2006.01)

(52) U.S. Cl.
CPC .............. *F02K 9/44* (2013.01); *F02K 9/46* (2013.01); *F02K 9/56* (2013.01); *F02K 9/563* (2013.01); *F02K 9/566* (2013.01); *F02K 9/805* (2013.01); *F02K 9/84* (2013.01); *F02K 9/62* (2013.01); *F05D 2240/35* (2013.01); *F05D 2260/606* (2013.01)

(58) Field of Classification Search
CPC ... F02K 9/566; F02K 9/58; F02K 9/62; F02K 9/80; F02K 9/84; F02K 9/805; B64G 1/401; B64G 1/402; F05D 2260/606; F02C 7/22; F02C 7/232; F02C 9/26; F02C 9/263; F02C 9/28; F02C 9/285; F02C 9/30; F02C 9/32; F02C 9/36; Y10T 137/85954; Y10T 137/85978
See application file for complete search history.

(56) References Cited

U.S. PATENT DOCUMENTS

| | | | | |
|---|---|---|---|---|
| 3,172,254 | A | | 3/1965 | Wright |
| 3,229,459 | A | * | 1/1966 | Cervenka ................ F02K 9/78 60/244 |
| 3,368,349 | A | * | 2/1968 | Johnson .................... F02C 9/16 60/39.281 |
| 5,187,936 | A | * | 2/1993 | Kast ........................ F02C 7/232 417/302 |
| 6,135,393 | A | * | 10/2000 | Sackheim ................ B64G 1/26 244/169 |
| 6,176,076 | B1 | * | 1/2001 | Ford ....................... F02C 9/263 60/39.281 |
| 8,366,404 | B2 | * | 2/2013 | Griffiths ................. F01D 21/18 417/213 |
| 2009/0126802 | A1 | * | 5/2009 | Rawlinson ............. F02C 7/228 137/98 |
| 2013/0263826 | A1 | | 10/2013 | Bickley |

OTHER PUBLICATIONS

International Search Report for International Patent Application No. PCT/US2016/040629 completed Oct. 20, 2016.

* cited by examiner

US 10,837,406 B2

FLOW CONTROL SYSTEM FOR A ROCKET ENGINE WITH PARALLEL FUEL PASSAGE NETWORK

BACKGROUND

Liquid propulsion rocket engines may include a thrust vector control actuator to vector engine thrust. The thrust vector control actuator is powered hydraulically by fuel (i.e., fueldraulic) tapped from a fuel supply to a main combustion chamber. The fuel that hydraulically powers the thrust vector control actuator is then conveyed back into the main fuel supply. Thus, operation of the thrust vector control actuator changes the fuel flow in the main fuel supply to the main combustion chamber, which in turn can alter the fuel/oxidizer mixing ratio in the main combustion chamber or require controls and hardware to adjust oxidizer flow.

SUMMARY

A flow control system according to an example of the present disclosure includes a fuel passage network that has first and second network portions that are in a parallel flow arrangement with each other. A fueldraulic device is located in the first network portion. Operation of the fueldraulic device varies flow through the first network portion. A flow restriction orifice is located in the fuel passage network. The flow restriction orifice is arranged in series with, and upstream of, the fueldraulic device. The flow restriction orifice is operable to generate a pressure differential that varies responsive to the flow through the first network portion. There is a flow control valve located in the second network portion. The flow control valve is operable responsive to the pressure differential across the flow restriction orifice to control flow through the second network portion.

In a further embodiment of any of the foregoing embodiments, the fueldraulic device is a thrust control valve.

In a further embodiment of any of the foregoing embodiments, the flow control valve includes a pressure port that opens to the fuel passage network upstream of the flow restriction orifice. The pressure port operatively connects the fuel passage network with a valve member of the flow control valve.

In a further embodiment of any of the foregoing embodiments, the second network portion includes a bypass passage, and the valve member is moveable in the bypass passage via the pressure port and the pressure differential to control flow through the bypass passage.

In a further embodiment of any of the foregoing embodiments, the flow control valve is biased to an open position permitting flow through the second network portion.

In a further embodiment of any of the foregoing embodiments, the flow control valve includes a bias member, a valve member, and a power piston.

In a further embodiment of any of the foregoing embodiments, the flow control valve includes a pressure port that opens to the fuel passage network upstream of the flow restriction orifice. The pressure port operatively connects the fuel passage network with the power piston.

In a further embodiment of any of the foregoing embodiments, the fuel passage network includes a common passage downstream of the first and second network portions, at which the first and second network portions merge.

The flow control system as recited in claim 8, further comprising a pump having a pump inlet connected with the common passage.

The flow control system as recited in claim 9, further comprising a combustion chamber and a fuel supply passage that connects a pump outlet of the pump with the combustion chamber.

In a further embodiment of any of the foregoing embodiments, the fuel passage network includes a tap passage off of the fuel supply passage. The tap passage is connected with the first and second network portions.

In a further embodiment of any of the foregoing embodiments, the tap passage includes a pressure regulator.

In a further embodiment of any of the foregoing embodiments, the fuel passage network includes at least one pressure balance passage that operatively connects a bias member cavity of the flow control valve with a location in the fuel passage network between the flow restriction orifice and the fueldraulic device.

A rocket engine according to an example of the present disclosure includes a combustion chamber, a pump that has a pump inlet and a pump outlet, a supply passage connecting the pump outlet with the combustion chamber, and a fuel passage network. The fuel passage network has first and second network portions that are in a parallel flow arrangement with each other, and a tap passage off of the supply passage. The tap passage is connected with the first and second network portions. A common passage is downstream of the first and second network portions, at which the first and second network portions merge. The common passage connects to the pump inlet. There is a fueldraulic thrust control valve actuator located in the first network portion. Operation of the fueldraulic thrust control valve actuator varies flow through the first network portion. The flow restriction orifice is arranged in series with, and upstream of, the fueldraulic thrust control valve actuator. The flow restriction orifice is operable to generate a pressure differential that varies responsive to the flow through the first network portion. There is a flow control valve located in the second network portion. The flow control valve is operably responsive to the pressure differential across the flow restriction orifice to control flow through the second network portion.

In a further embodiment of any of the foregoing embodiments, the fuel passage network is operable to provide constant flow from the tap passage to the common passage independent of variation in flow through the fueldraulic thrust control valve actuator in the first network portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
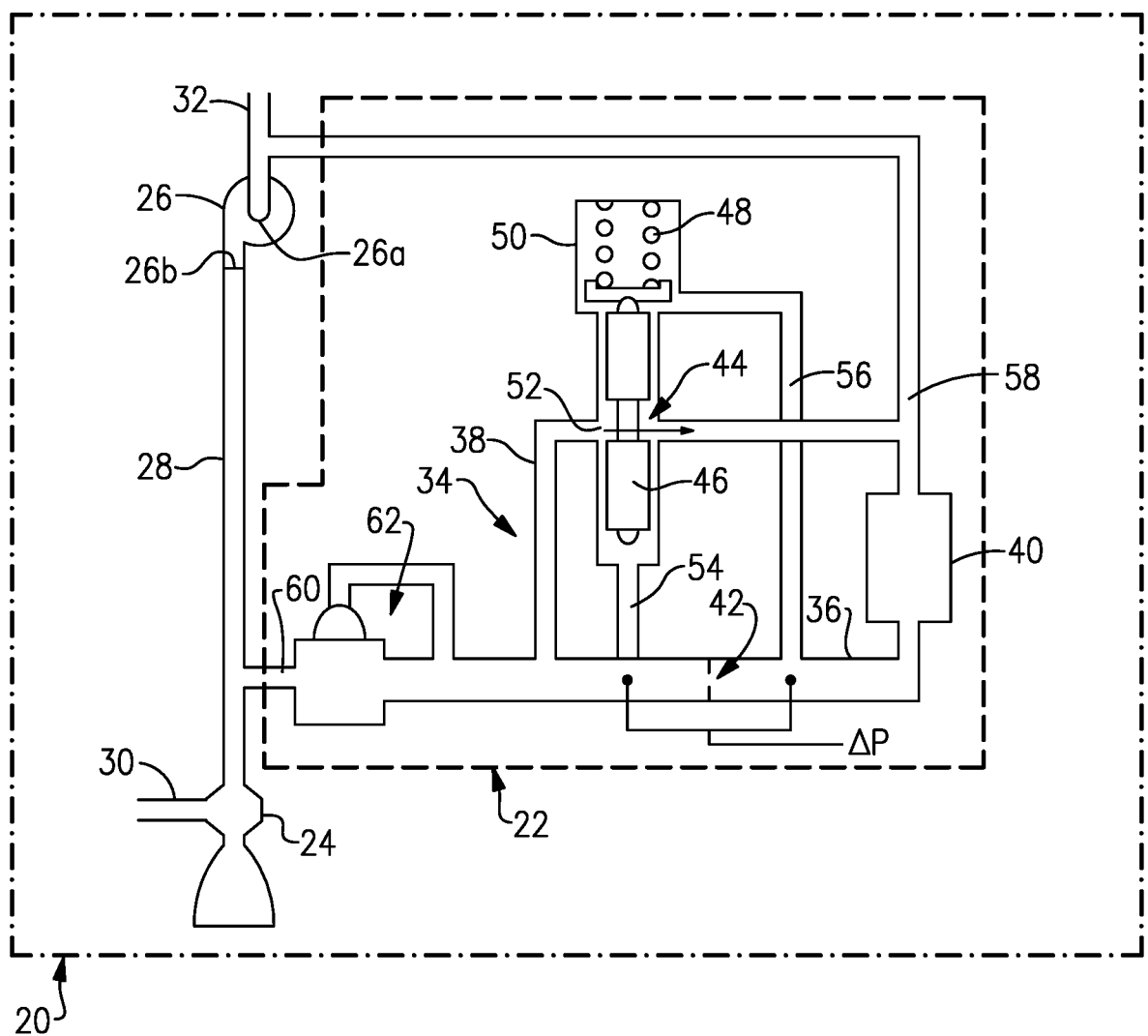
FIG. 1 illustrates a rocket engine with an example flow control system.

FIG. 1 schematically illustrates an example rocket engine 20, such as a liquid propulsion rocket engine, that includes a flow control system 22. As will be described, the flow control system 22 permits operation of a fueldraulic device while reducing or eliminating fluctuations in fuel flow to a combustor.

As shown, the rocket engine 20 includes a combustion chamber 24 and a pump 26 that has a pump inlet 26a and a pump outlet 26*b*. A fuel supply passage 28 connects the pump outlet 26*b* with the combustion chamber 24. The combustion chamber 24 is also connected with an oxidizer source passage 30, which receives oxidizer from an oxidizer supply source (not shown). The pump inlet 26*a* is connected with fuel source passage 32, which receives fuel from a fuel supply source (not shown). As can be appreciated, the rocket engine 20 may include additional components related to the operation thereof, which are generally known and thus not described herein.

The flow control system 22 includes a fuel passage network 34. The fuel passage network 34 includes a first network portion 36 and a second network portion 38. The first and second network portions 36/38 are in a parallel flow arrangement with each other. For example, as used herein, a parallel flow arrangement is an arrangement that provides more than one path through the fuel passage network 34.

The flow control system 22 further includes a fueldraulic device 40 that is located in the first network portion 36. For example, operation of the fueldraulic device 40 (a fueldraulic load) varies flow of fuel through the first network portion 36. In one example, the fueldraulic device 40 is a thrust vector control actuator that is operable to gimbal the engine. When the thrust vector control actuator is operated, fuel flows through the first network portion 36. When the thrust vector control actuator is fully dormant, there is no flow or less flow through the first network portion 36. There may also be intermediate levels of operation of the thrust vector control actuator and thus intermediate levels of fuel flow through the first network portion 36.

The flow control system 22 further includes a flow restriction orifice 42 that is located in the fuel passage network 34 in series with, and upstream of, the fueldraulic device 40. The flow restriction orifice 42 is an orifice that is narrower in cross-sectional size than the cross-sectional size of the fuel passage network 34 upstream and downstream of the flow restriction orifice 42. The flow restriction orifice 42, which may also be considered a sensing orifice, is operable to generate a pressure differential ($\Delta P$) that varies responsive to the flow through the first network portion 36.

The pressure differential ($\Delta P$) is the difference in fuel pressure between a location upstream of the flow restriction orifice 42 and a location downstream of the flow restriction orifice 42. Typically, these locations will be immediately upstream and downstream of the flow restriction orifice 42. For example, when fuel passes through the flow restriction orifice 42, the fuel is restricted by the flow restriction orifice 42. As the fuel converges and passes through the flow restriction orifice 42, fuel flow velocity increases and the pressure decreases such that there is the pressure differential $\Delta P$ across the flow restriction orifice 42. The pressure differential $\Delta P$ varies in proportion to mass flow of fuel through the flow restriction orifice 42.

The flow control system 22 also includes a flow control valve 44 that is located in the second network portion 38. The flow control valve 44 in the illustrated example includes a valve member 46 and a bias member 48, such as a spring, that is situated in a bias member cavity 50. The bias member 48 serves to bias the valve member 46 to an open position with regard to flow through the second network portion 38. For example, the second network portion 38 includes a bypass passage 52, and the valve member 46 (e.g., a spool) is movable in the bypass passage 52 to control fuel flow there through.

The flow control valve 44 further includes a pressure port 54 that opens to the fuel passage network 34 upstream of the flow restriction orifice 42. The pressure port 54 operatively connects the fuel passage network 34 with the valve member 46. As shown, the fuel passage network 34 also includes at least one pressure balance passage 56 that operatively connects the bias member cavity 50 of the flow control valve 44 with a location in the fuel passage network 34 that is between the flow restriction orifice 42 and the fueldraulic device 40.

The first and second network portions 36/38 merge at a common passage 58. The common passage 58 connects the first and second network portions 36/38 to the pump inlet 26*a*. The fuel passage network 34 includes a tap passage 60 off of the fuel supply passage 28. Although the tap passage 60 in this example is off of the fuel supply passage 28, the tap passage 60, and thus the flow control system 22, could be located off of another portion of the fuel supply passage 28 or elsewhere in a fuel supply system.

The fuel passage network 34, in combination with the pump 26 and the fuel supply passage 28, forms a fuel circuit loop that bypasses fuel flow to the combustion chamber 24. The tap passage 60 is connected with the first and second network portions 36/38. In this example, the tap passage 60 includes a pressure regulator 62 that serves to provide constant pressure fuel into the fuel passage network 34 from the fuel supply passage 28. Thus, in operation, the pump 26 moves fuel through the fuel supply passage 28. A portion of the fuel from the fuel supply passage 28 flows to the combustion chamber 24 and another portion of the fuel is "bled" into the fuel passage network 34 via the tap passage 60. The fuel that flows into the fuel passage network 34 is circulated back to the pump 26 at pump inlet 26*a* via the common passage 58.

The flow control system 22 permits fuel to flow, when needed, to the fueldraulic device 40 without altering the fuel flow in the fuel supply passage 28 to the combustion chamber 24. When there is less flow or no flow needed to the fueldraulic device 40, fuel can instead flow through the second network portion 38. Thus, variation in fuel flow to the fueldraulic device 40 does not alter the total, constant flow through the flow control system 22 or flow through the fuel supply passage 28 to the combustion chamber 24.

In this regard, there are at least two functional states in which fuel flows through the flow control system 22. In a first state the fueldraulic device 40 is inactive, i.e., is dormant, and there is low flow or no flow of fuel through the first network portion 36. In the first state, most or all of the fuel instead flows through the second network portion 38.

In the second state the fueldraulic device 40 is active and thus creates a demand for fuel flow in the first network portion 36. In the second state, most or all of the fuel may flow through the first network portion 36 and fueldraulic device 40, and less fuel or no fuel flows through the second network portion 38. The total fuel flow through the flow control system 22 is constant though, regardless of which state. There may also be intermediate levels of operation of the fueldraulic device 40 and thus intermediate levels of fuel flow through the first network portion 36.

The bias member 48 of the flow control valve 44 generally biases the valve member 46 to an open position such that fuel can, by default, flow through the bypass passage 52 into the common passage 58 when the fueldraulic device 40 is inactive. The position of the valve member 46 is subject to the pressure differential $\Delta P$ across the flow restriction orifice 42 though. As an example, when most or all of the fuel flows through the flow restriction orifice 42, into the fueldraulic device 40, and through to the common passage 58 to the pump inlet 26*a*, the pressure differential $\Delta P$ is high.

When most or all of the fuel flows through the second network portion 38, there is little or no fuel flow through the first network portion 36 (because the fueldraulic device 40 is inactive), and the pressure differential ΔP is zero or is at least below a pressure threshold that is high enough to actuate the valve member 46 against the bias member 48. In this case, because the valve member 46 is biased to an open position, fuel can bypass the first network portion 36 and flow through the second network portion 38 to the common passage 58 and pump 26.

When there is a demand for fuel flow into the first network portion 36 because of operation of the fueldraulic device 40, the pressure differential ΔP across the flow restriction orifice 42 increases. The pressure differential ΔP causes an increase in pressure near the pressure port 54 while generally decreasing the pressure behind the valve member 46 in the bias member cavity 50 by way of the pressure balance passage 56. The increase in pressure at the pressure port 54 serves to actuate the valve member 46 against the bias force of the bias member 48 to close or partially close the bypass passage 52. In this case, less flow or no flow is permitted through the bypass passage 52 while flow is permitted through the first network portion 36 and fueldraulic device 40. Since the pressure port 54 is downstream of the pressure regulator 62, there are no fuel flow variations in the fuel passage network 34, other than the pressure differential ΔP, acting on the valve member 46.

As can be appreciated, the position of the valve member 46 depends on the pressure differential ΔP and bias force of the bias member 48. That is, at intermediate pressure differentials ΔP the valve member 46 may partially close to permit partial flow of fuel through the bypass passage 52 and partial flow of fuel though the fueldraulic device 40. Thus, the flow through the first network portion 36 is inversely proportional to the flow through the second network portion 38 such that, ultimately, the flow to the common passage 58 is constant.

The size of the valve member 46 and the size of the bias member 48 can be tailored with regard to the size of the flow restriction orifice 42 such that the flow control valve 44 operates within the actual range of pressure differentials produced by the flow restriction orifice 42. The range of pressure differentials may be from zero or near zero (when there is no flow through the first network portion 36 because the fueldraulic device 40 is inactive) to a maximum pressure differential (when there is full flow through the first network portion 36 because the fueldraulic device 40 is fully open). Additionally, the flow control valve 44 may be tailored to desirably proportion the flow between the first and second network portions 36/38. For example, the flow control valve 44 acts within a linear spring response range of the bias member 48 such that the flow is linearly proportioned between the first and second network portions 36/38. Moreover, the flow control valve 44 operates passively, without reliance on electronic control signals, in response to the pressure differential ΔP. Therefore, there is no need for complicated control schemes and electronic circuitry.

The fuel flow through the flow control system 22 for operating the fueldraulic device 40 may be a relatively small percentage of the (main) pump 26 discharge flow. The effect of fuel flow fluctuation on fuel/oxidizer mixing ratio may be less in the illustrated configuration than if the fuel flow through the flow control system 22 was taken off a boost pump to a pre-burner or gas generator. A boost pump may be configured to provide the additional constant fuel flow. Since a boost pump discharge pressure is relatively high (compared to a main pump discharge pressure) at a typical throttled engine power level (e.g., 40%), the size of the actuator for thrust vector control may be reduced in comparison to running it from a lower main pump discharge pressure. By utilizing a constant fuel flow, engine thrust or mixture ratio would not be affected by thrust vector control actuator motion. Moreover, accurate engine thrust or mixture ratio may be scheduled via fuel valves of a pre-burner, gas generator or main combustor based on throttle valve position.

Figure 2:
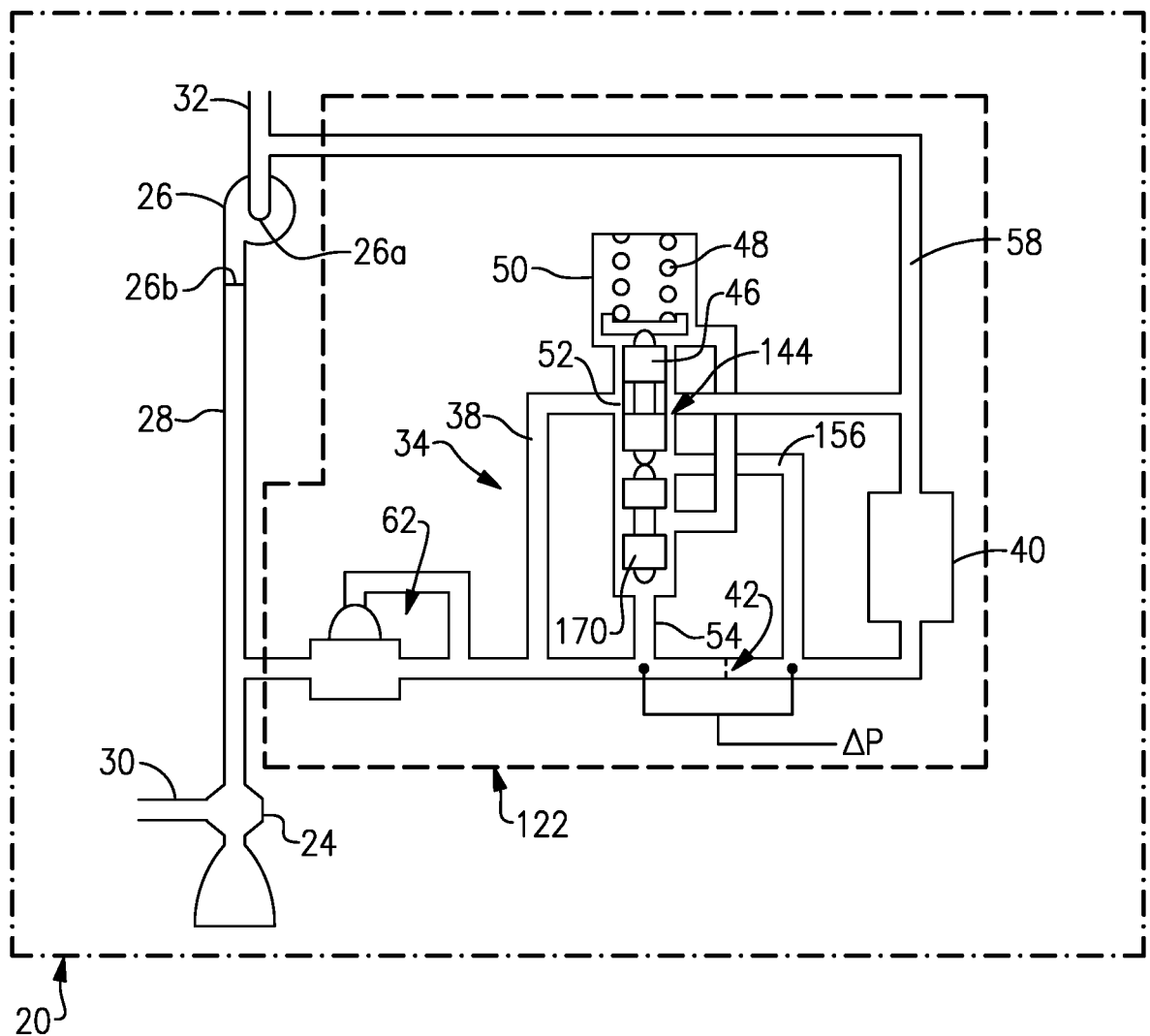
FIG. 2 illustrates a rocket engine with another example flow control system.

FIG. 2 illustrates another example of the rocket engine 20 and a flow control system 122. The flow control system 122 is similar to the flow control system 22 except that the flow control valve 144 includes a power piston 170. The power piston 170 is coaxially located adjacent the valve member 46, but is not physically connected with the valve member 46. The power piston 170 is operatively connected with the pressure port 54 such that the pressure differential ΔP acts on the power piston 170. In this regard, the effective area of the power piston 170 upon which the pressure differential ΔP acts can be tailored to act on the valve member 46 against the bias force provided by the bias member 48. For instance, the size of the power piston 170 is tailored such that under a maximum fuel flow through the first network portion 36 to the fueldraulic device 40, the differential pressure ΔP across the flow control orifice 42 will be sufficient to move the valve member 46 to the fully closed position. With such a configuration, if the maximum differential pressure ΔP would otherwise be insufficient to act on the valve member 46 alone against the bias member 48, the power piston 170 in essence increases the actuating force from the differential pressure ΔP in order to operate the valve member 46.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A flow control system for a rocket engine comprising:
a fuel passage network to deliver a liquid propellant to a combustion chamber of the rocket engine, the fuel passage network including first and second network portions that are in a parallel flow arrangement with each other;
a fueldraulic device in the first network portion, wherein operation of the fueldraulic device varies flow through the first network portion, the second network portion including a bypass passage bypassing the fueldraulic device;
a flow restriction orifice in the fuel passage network, the flow restriction orifice arranged in series with, and upstream of, the fueldraulic device, the flow restriction orifice operable to generate a pressure differential that varies responsive to the flow through the first network portion; and
a flow control valve including a valve member in the bypass passage, the flow control valve including, separate from the bypass passage, a pressure port that opens to the fuel passage network upstream of the flow restriction orifice and a pressure balance passage connecting a bias member cavity of the flow control valve with a location in the fuel passage network between the flow restriction orifice and the fueldraulic device, the valve member being moveable responsive to the pressure differential across the valve member via the passage port and the pressure balance passage to control flow through the bypass passage.

2. The flow control system as recited in claim 1, wherein the fueldraulic device is a thrust control valve.

3. The flow control system as recited in claim 1, wherein the flow control valve is biased to an open position permitting flow through the bypass passage.

4. The flow control system as recited in claim 1, wherein the flow control valve includes a power piston.

5. The flow control system as recited in claim 4, wherein the pressure port operatively connects the fuel passage network with the power piston.

6. The flow control system as recited in claim 1, wherein the fuel passage network includes a common passage downstream of the first and second network portions, at which the first and second network portions merge.

7. The flow control system as recited in claim 6, further comprising a pump having a pump inlet connected with the common passage.

8. The flow control system as recited in claim 7, further comprising a fuel supply passage that connects a pump outlet of the pump with the combustion chamber.

9. The flow control system as recited in claim 8, wherein the fuel passage network includes a tap passage off of the fuel supply passage, the tap passage being connected with the first and second network portions.

10. The flow control system as recited in claim 9, wherein the tap passage includes a pressure regulator.

11. The flow control system as recited in claim 1, wherein the bypass passage is unbranched.

12. The flow control system as recited in claim 1, wherein an inlet of the fueldraulic device is downstream of the flow restriction orifice.

13. A rocket engine comprising:
a combustion chamber of the rocket engine;
a pump having a pump inlet and a pump outlet;
a supply passage connecting the pump outlet with the combustion chamber; and
a fuel passage network including:
first and second network portions that are in a parallel flow arrangement with each other,
a tap passage off of the supply passage, the tap passage being connected with the first and second network portions,
a common passage downstream of the first and second network portions, at which the first and second network portions merge, the common passage connecting to the pump inlet,
a fueldraulic thrust control valve actuator in the first network portion, wherein operation of the fueldraulic thrust control valve actuator varies flow through the first network portion, the second network portion including a bypass passage bypassing the fueldraulic thrust control valve actuator,
a flow restriction orifice in the fuel passage network, the flow restriction orifice arranged in series with, and upstream of, the fueldraulic thrust control valve, the flow restriction orifice operable to generate a pressure differential that varies responsive to the flow through the first network portion, and
a flow control valve including a valve member in the bypass passage, the flow control valve including, separate from the bypass passage, a pressure port that opens to the fuel passage network upstream of the flow restriction orifice and a pressure balance passage connecting a bias member cavity of the flow control valve with a location in the fuel passage network between the flow restriction orifice and the fueldraulic thrust control valve actuator, the valve member being moveable responsive to the pressure differential across the valve member via the pressure port and the pressure balance passage to control flow through the bypass passage.

14. The rocket engine as recited in claim 13, wherein the fuel passage network is operable to provide constant flow from the tap passage to the common passage independent of variation in flow through the fueldraulic thrust control valve actuator in the first network portion.

* * * * *